Nov. 12, 1957 P. R. PIERSON ET AL 2,813,178

DISCONNECTING SWITCH

Filed Sept. 14, 1954 8 Sheets-Sheet 1

WITNESSES

Wm. C. Groome

Robert C. Baird

INVENTORS

Paul R. Pierson, Harold H. Rugg and Richard R. Jank, Jr.

BY [signature]

ATTORNEY

Nov. 12, 1957 P. R. PIERSON ET AL 2,813,178

DISCONNECTING SWITCH

Filed Sept. 14, 1954 8 Sheets-Sheet 3

Nov. 12, 1957 P. R. PIERSON ET AL 2,813,178

DISCONNECTING SWITCH

Filed Sept. 14, 1954 8 Sheets-Sheet 4

Nov. 12, 1957 P. R. PIERSON ET AL 2,813,178

DISCONNECTING SWITCH

Filed Sept. 14, 1954 8 Sheets-Sheet 6

Nov. 12, 1957 P. R. PIERSON ET AL 2,813,178

DISCONNECTING SWITCH

Filed Sept. 14, 1954 8 Sheets-Sheet 8

United States Patent Office 2,813,178
Patented Nov. 12, 1957

2,813,178

DISCONNECTING SWITCH

Paul R. Pierson and Harold H. Rugg, Penn Township, Allegheny County, and Richard R. Jank, Jr., Pittsburgh, Pa., assignors to Westinghouse Electric Corporation, East Pittsburgh, Pa., a corporation of Pennsylvania Application September 14, 1954, Serial No. 455,972

20 Claims. (Cl. 200—163)

Our invention relates, generally, to disconnecting switches and, more particularly, to disconnecting switches suitable for utilization in a high voltage bus structure of the type in which each phase is completely enclosed in an individual duct or housing.

An object of our invention, generally stated, is to provide a disconnecting switch of the isolated phase type which shall be simple and efficient in operation and which may be economically manufactured and installed.

A more specific object of our invention is to provide an enclosed disconnecting switch capable of withstanding high impulse voltages.

Another object of our invention is to provide a disconnecting switch having a blade member which telescopes inside stationary contact members of the switch.

A further object of our invention is to provide reciprocating mechanical means for actuating the telescoping member of the switch.

Another object of our invention is to provide guide means for the reciprocating means.

Still another object of our invention is to provide insulating means for attaching the telescoping member to the mechanical actuating means of the switch.

A still further object of our invention is to provide a sliding connection between the telescoping member and the stationary members of the switch.

A further object of our invention is to utilize a terminal of the condenser bushing type as one of the contact members of a disconnecting switch.

Another object of our invention is to provide for supporting a cylindrical switch member between oppositely disposed insulators in the switch housing.

Other objects of our invention will be explained fully hereinafter or will be apparent to those skilled in the art.

In accordance with one embodiment of our invention, two hollow cylindrical switch members are spaced axially and maintained in alinement by oppositely disposed insulators mounted in a box-like housing. A reciprocating member connects the two spaced members when in the closed position and telescopes into one of the spaced members when in the open position. The telescoping member is supported by a carriage which is slidably mounted on guide rods in the housing. The carriage is reciprocated by a rack and pinion driven by a hand wheel through suitable gearing and shafts.

For a better understanding of the nature and objects of the invention, reference may be had to the following detailed description, taken in conjunction with the accompanying drawings, in which.

Figure 1:
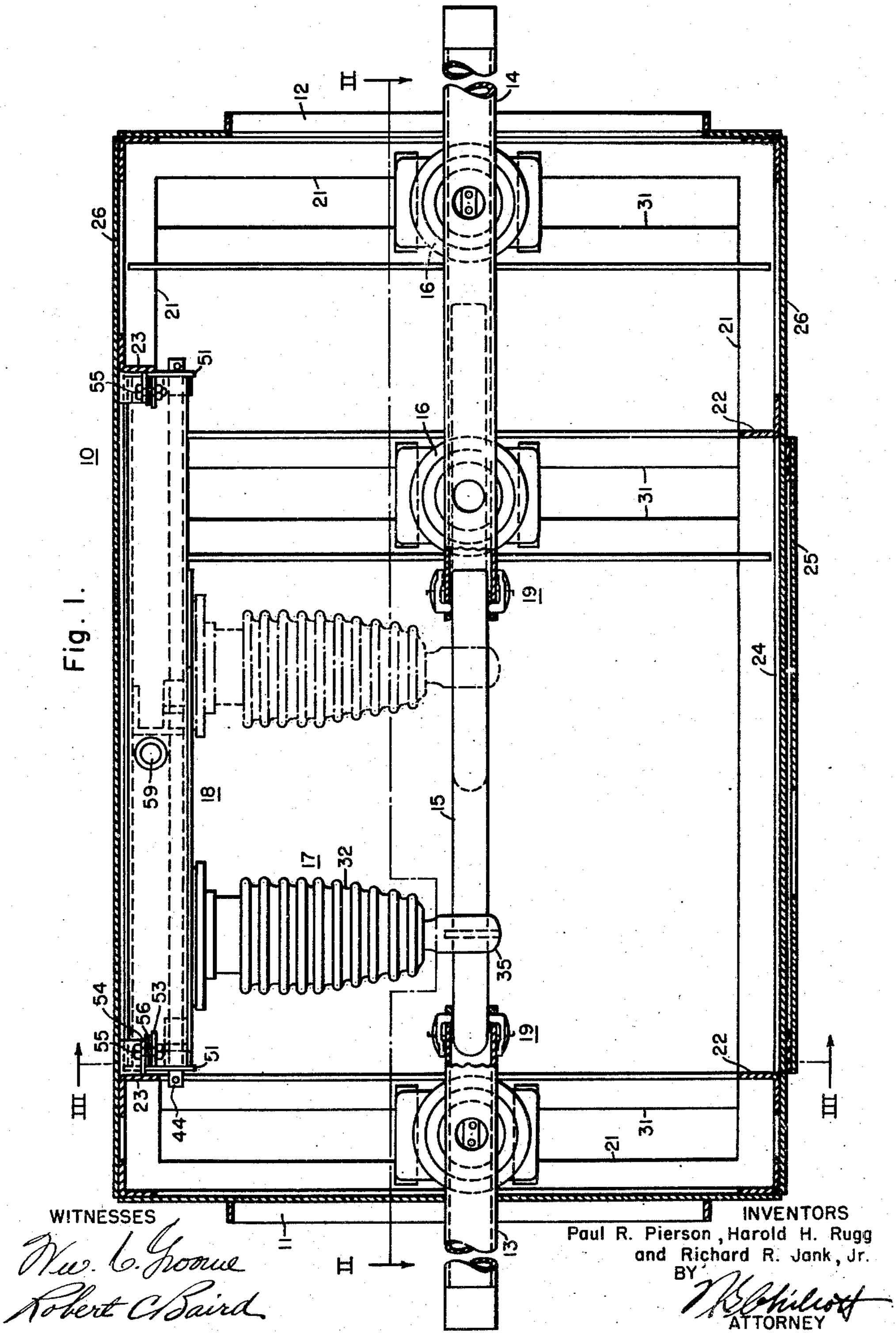
Figure 1 is a view, partly in section and partly in elevation, of a disconnecting switch structure embodying the principal features of the invention.
Figure 2:
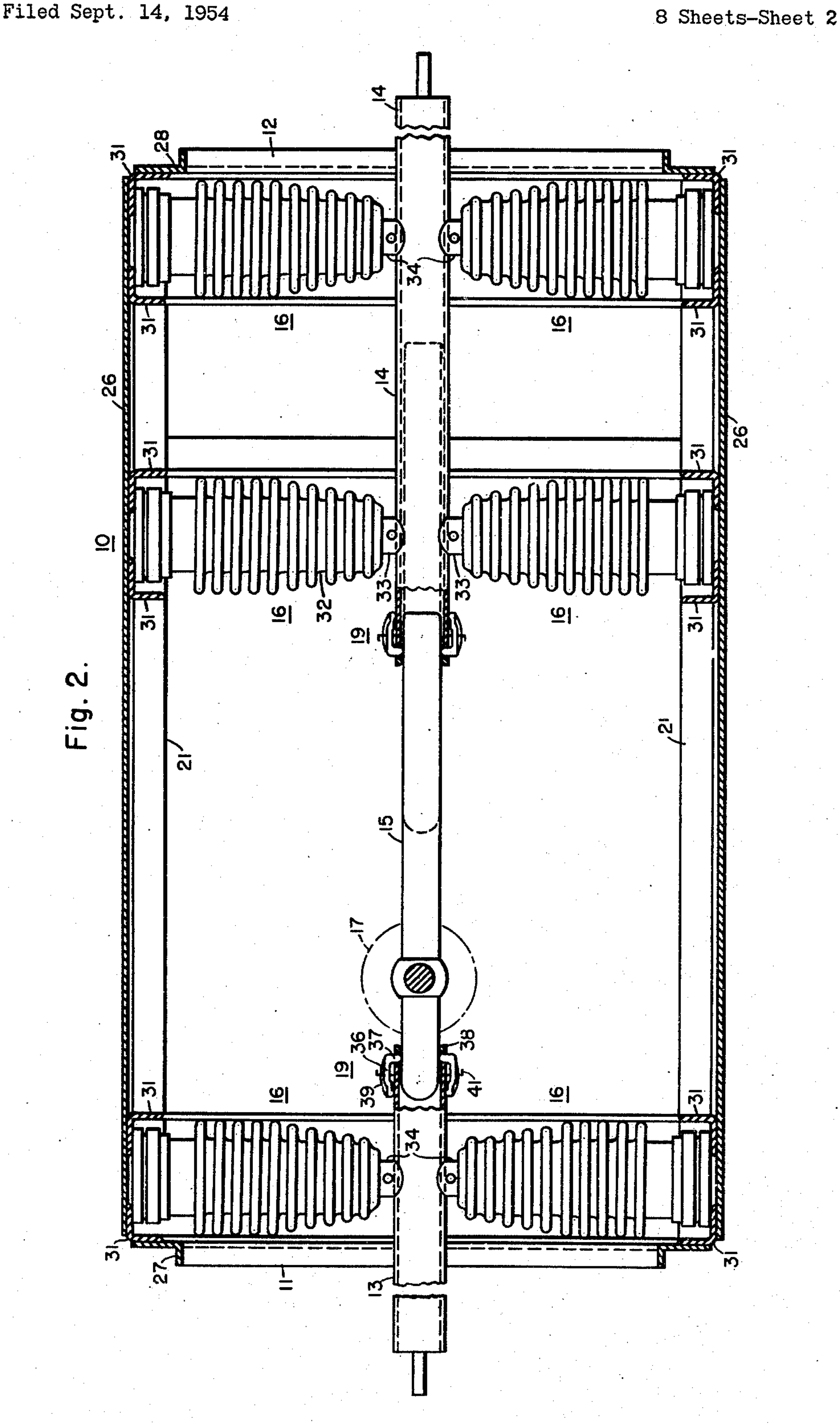
Fig. 2 is a view, in section, taken along the line II—II in Fig. 1.
Figure 3:
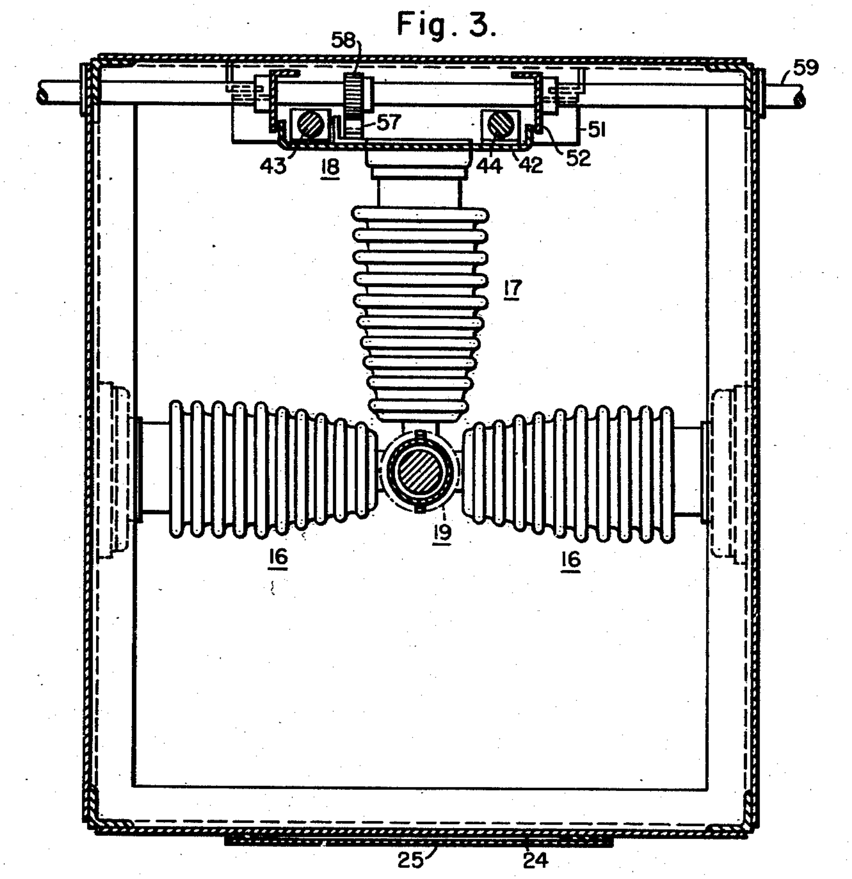
Fig. 3 is a view, in section, taken along the line III—III in Fig. 1.

Referring to the drawings, and particularly to Figs. 1, 2 and 3, the disconnecting switch structure shown therein comprises a box-like metal housing 10 having round openings 11 and 12 at opposite ends of the housing, a hollow cylindrical conductor 13 which extends through the opening 11 and terminates inside the housing 10, another hollow cylindrical conductor 14 which extends through the opening 12 and terminates inside the housing 10, a cylindrical blade member 15 which connects the ends of the conductors 13 and 14 inside the housing when it is in the closed position, oppositely disposed insulators 16 mounted inside the housing for supporting the conductors 13 and 14, an insulator 17 which is mounted on a reciprocating carriage 18 for supporting the switch blade 15, and two sets of contact members 19 mounted on the conductors 13 and 14 for engaging the switch blade 15, there being one set of contact members at the inner end of the conductor 13 and another set at the inner end of the conductor 14.

The housing 10 comprises welded angle frame members 21 extending around the edges of the rectangular housing, angle members 22 which extend across the housing at the bottom and angle members 23 which extend across the housing at the top. The angle members 22 are disposed at the edges of an opening 24 in the bottom of the housing to provide access to the switch members. The opening 24 is closed by a door 25. Metal side sheets 26 are attached to the frame members to enclose the housing.

The angle members 23 are provided at the top of the housing to support the carriage 18, as will be described more fully hereinafter. The circular opening 11 is surrounded by a flanged end plate 27. Likewise, the opening 12 is surrounded by a flanged end plate 28. The end plates 27 and 28 are provided for attaching cylindrical housing sections for enclosing the bus conductors 13 and 14 generally in the manner described in Patent 2,531,017, issued November 21, 1950 to C. P. West, P. R. Pierson and H. H. Rugg.

As shown, the bases of the insulators 16 are attached to angle members 31 which in turn are welded to the angle members 21 in the housing. The insulators 16 are fully described in a copending application of B. P. Baker and P. R. Pierson, Serial No. 455,958, filed September 14, 1954. Each insulator comprises a body 32, preferably composed of porcelain, and a metal insert 33 or 34 having one end secured in the body 32. The structure of the inserts 33 and 34 which engage the conductor will be described more fully hereinafter. The body of the insulator 17 is similar to the body 32 of the insulator 16. An insert 35 is secured in the end of the insulator 17 to support the switch blade 15. The structure of the insert 35 which is attached to the blade 15 will be described more fully hereinafter.

As shown by the broken lines in Fig. 1, the switch blade 15 telescopes into the conductor 14 to open the switch. When the blade 15 is in the closed position, as shown by the full lines in Figs. 1 and 2, the ends of the blade are engaged by the contact members 19. The structure of the contact members 19 and electrostatic shields which may be placed around the contact members is fully described in a copending application of H. H. Rugg, Serial No. 460,171, filed October 4, 1954. Briefly, each contact member comprises a plurality of rigid contact fingers 36 which are disposed in spaced relation around the periphery of the conductor 13 or the conductor 14. One end of each finger 36 engages the outer periphery of the cylindrical conductor and the other end has an offset portion 37 which engages the cylindrical switch blade 15. The fingers 36 are retained on the conductor by means of a flanged ring 38 disposed inside the conductor and having openings therein for the offset portions 37 of the fingers. A generally flat spring 39 is provided on each finger for biasing the fingers inwardly. The springs 39 are retained in position by a ring 41 which surrounds the fingers 36. In this manner, sliding contact is maintained with the switch blade 15 during opening and closing of the switch. Since the rigid fingers 36 and not the springs 39 conduct the current between the switch blade and the cylindrical conductors, there is no problem of overheating the springs 39 to cause them to lose their temper.

Figure 4:
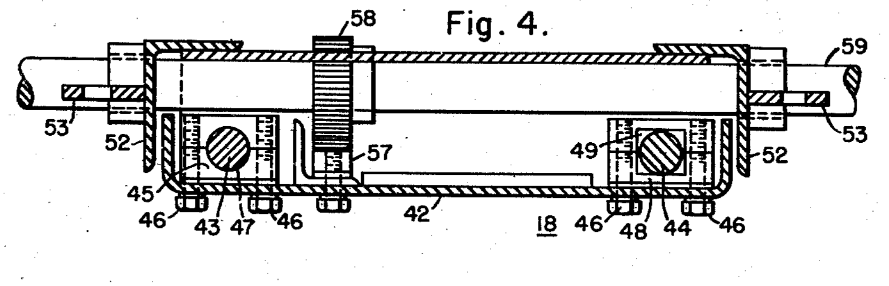
Fig. 4 is an enlarged view, in section, taken along the line IV—IV in Fig. 6.
Figure 5:
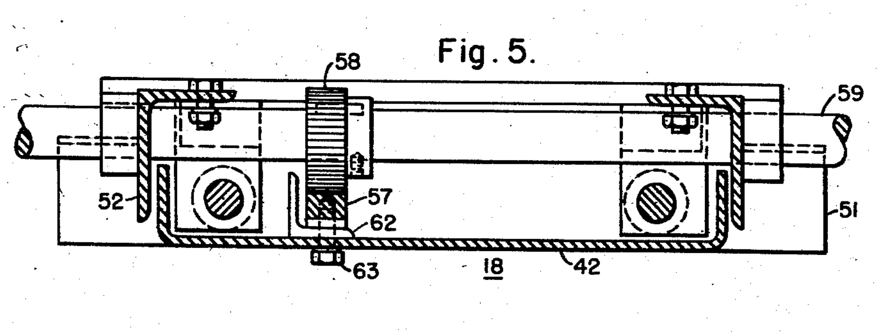
Fig. 5 is an enlarged view, in section, taken along the line V—V in Fig. 6.
Figure 6:
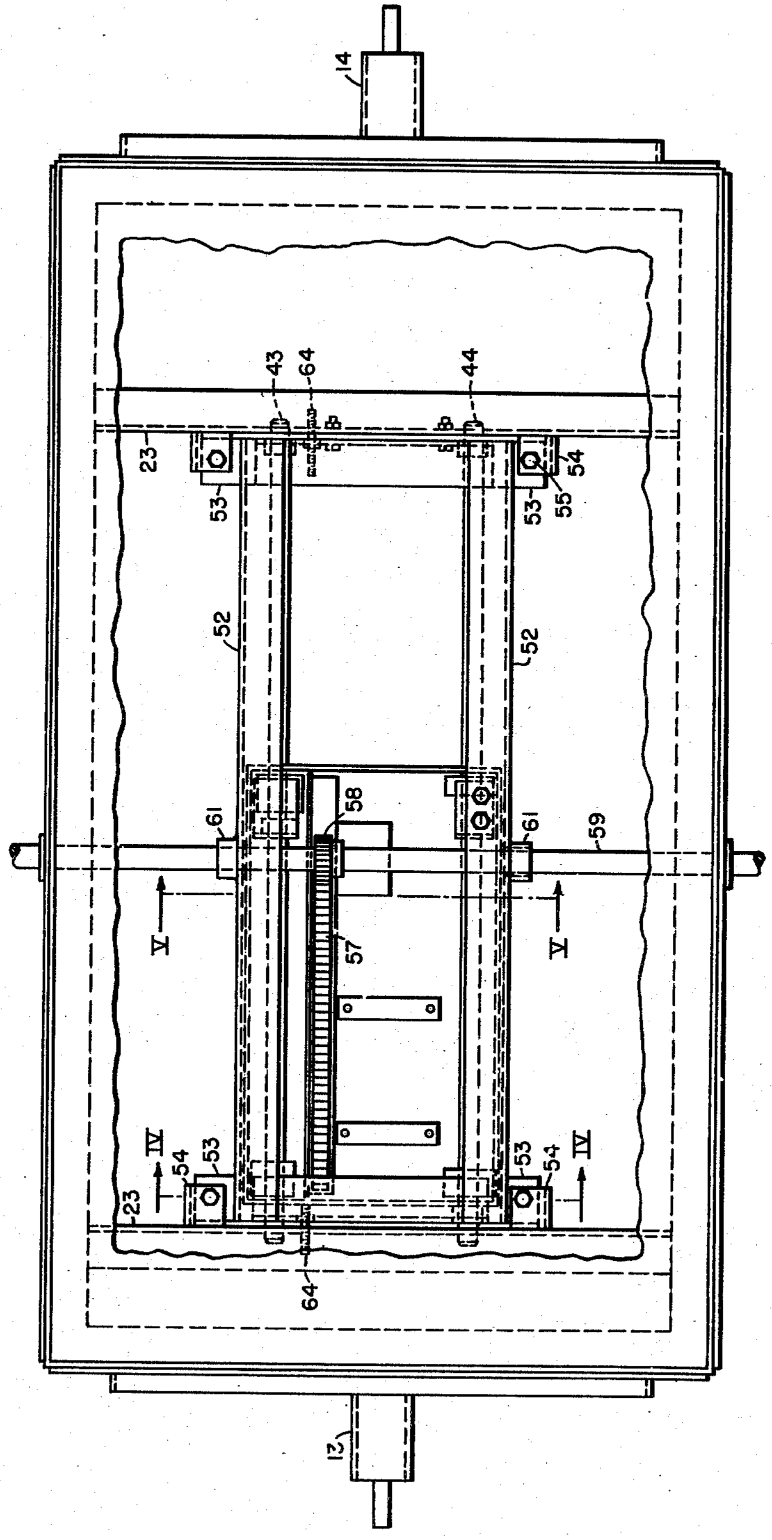
Fig. 6 is a view, in plan, of the switch structure, portions being broken away for clearness.

As previously explained, the switch blade 15 is reciprocated by the carriage 18. As shown most clearly in Figs. 3 to 6, inclusive, the carriage 18 comprises a channel-shaped metal pan 42 to which the base of the insulator 17 is attached. The pan 42 is slidably supported by a pair of spaced guide rods 43 and 44. Bearing blocks 45, which are attached to the pan 42 by screws 46, are provided on the rod 43 for supporting one side of the pan 42. As shown in Fig. 4, each block 45 has a semi-cylindrical groove 47 therein for engaging the round guide rod 43. Slightly different bearing blocks 48, which are attached to the pan 42 by screws 46, are provided on the rod 44 to support the other side of the pan 42. Each block 48 has a rectangular groove 49 therein for the guide rod 44. In this manner, a slight amount of lateral clearance is provided between the guide rod 44 and the bearing blocks 49, thereby preventing binding of the carriage on the guide rods.

As shown most clearly in Fig. 1, the ends of the guide rods 43 and 44 extend through transversely disposed end members 51. The members 51 are welded to longitudinally disposed angle bars 52 shown in Figs. 3, 4, 5 and 6. A laterally extending ear 53 is welded to the side of the angle bar 52 at each end of each angle bar 52. The ears 53 are attached to angle members 54 by bolts 55. The members 54 are welded to the angle members 23 which are part of the frame structure. As shown in Fig. 1, spacing washers or shims 56 may be provided between the ears 53 and the members 54 to adjust the height of the carriage 18, thereby alining the blade 15 with the cylindrical conductors 13 and 14, the ends of which are spaced in axial alinement.

As shown in Figs. 3 to 6, the carriage 18 is reciprocated by a rack 57 and a pinion 58 which is driven by a shaft 59 extending transversely of the housing. The shaft 59 is mounted in bearings 61 attached to the sides of the angle members 52. It will be understood that one shaft 59 may be utilized to operate a plurality of switches which it is desired to operate simultaneously. The shaft may be driven by a suitable mechanism (not shown). The rack 57 is mounted in the pan 42 on an angle bar 62. The rack and the bar 62 are attached to the pan by screws 63. Adjustable screws 64 are provided in the end members 51 for limiting the travel of the carriage 18 in either direction.

In this manner the carriage 18 may be reciprocated to open the switch by causing the blade 15 to telescope into the cylindrical conductor 14. Likewise, the switch may be closed by operating the carriage 18 to withdraw the blade 15 from the conductor 14 to a position in which it bridges the gap between the ends of the conductors 13 and 14 and is engaged by the contact members 19 in the manner previously described.

Figure 7:
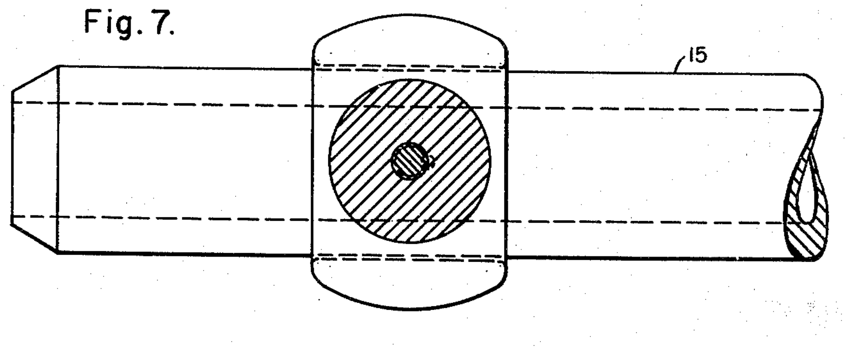
Figs. 7, 8 and 9 are enlarged views of the support for the switch blade.
Figure 8:
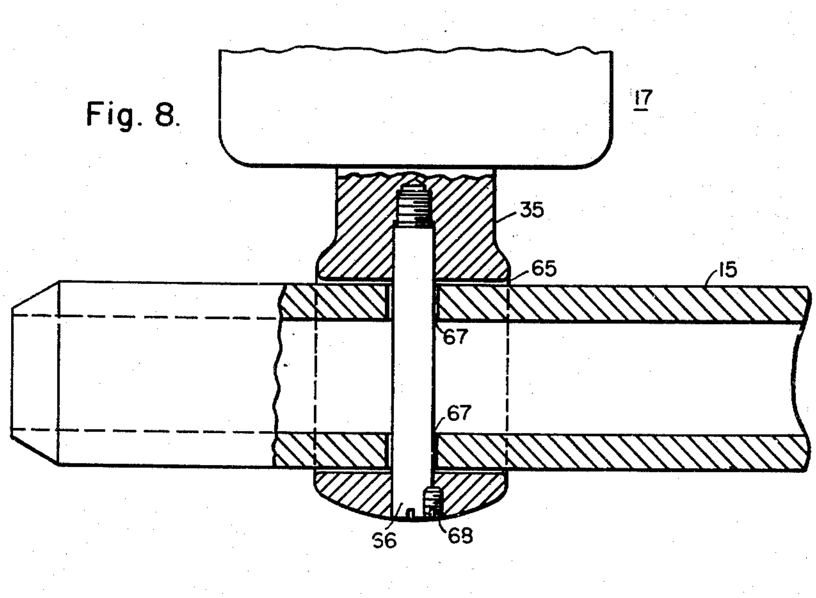
Figure 9:
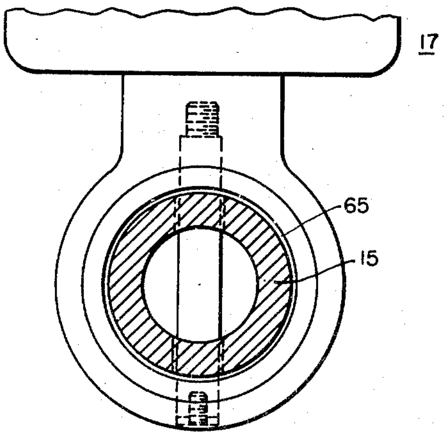

As shown in Figs. 7, 8 and 9, the metal insert 35, which is secured in the end of the insulator 17, has a cylindrical opening 65 therethrough for receiving the cylindrical switch blade 15. A screw 66 extends through the bottom of the insert 35 and holes 67 in the wall of the blade 15 and is threaded into the insert 35, thereby retaining the blade 15 in the insert 35. The screw 66 may be locked in position by means of a set screw 68. In this manner the one end of the blade 15 is supported by the insulator 17 which, in turn, is mounted on the carriage 18 as explained hereinbefore. The other end of the blade 15 is supported by the conductor 14 since this end is normally not withdrawn from the conductor 14.

Figure 10:
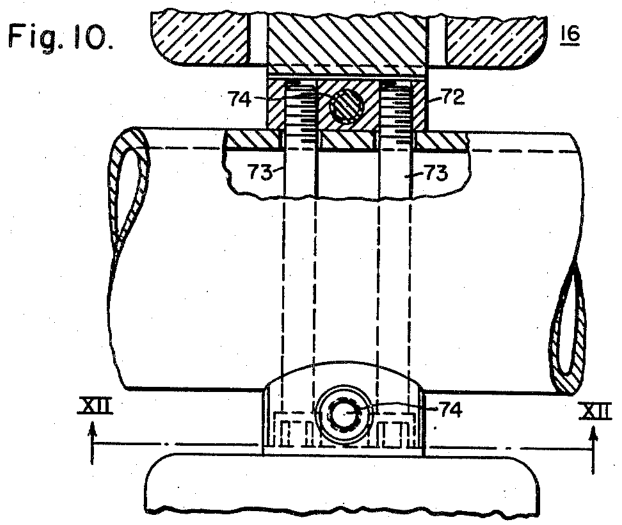
Figs. 10, 11 and 12 are enlarged views of the support for the break jaw of the switch.
Figure 11:
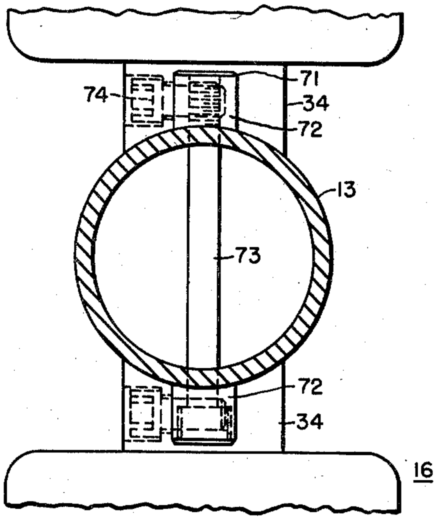
Figure 12:
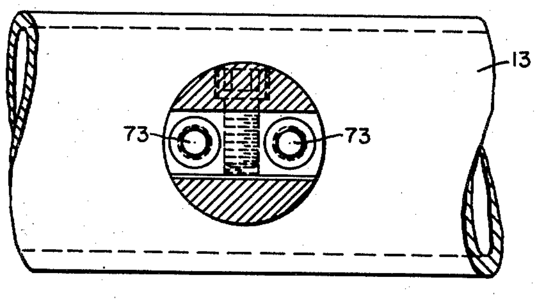

As shown in Figs. 10, 11 and 12, each metal insert 34, which is secured in one end of an insulator 16, has a generally concave surface for engaging the cylindrical conductor 13 or the conductor 14. As shown, the insert 34 has a groove 71 therein which extends longitudinally of the conductor 13. Blocks 72 are attached to diametrically opposite sides of the conductor 13 by screws 73 which extend through the conductor 13. The blocks 72 are attached to the conductor prior to its installation between a pair of oppositely disposed insulators 16. After the blocks are attached, the conductor 13 is moved longitudinally to insert the blocks 72 in the grooves 71 in the inserts 34.

When the blocks are in their proper position in the grooves 71, a screw 74 is threaded into each block 72 between the two screws 73. Since the screw 74 extends through a fixed portion of the insert 34, longitudinal movement of the conductor 13 is prevented. In this manner the conductor 13, which constitutes the break jaw of the switch, and the conductor 14, which constitutes the sliding jaw of the switch, are securely held in position during operation of the switch.

Figure 13:
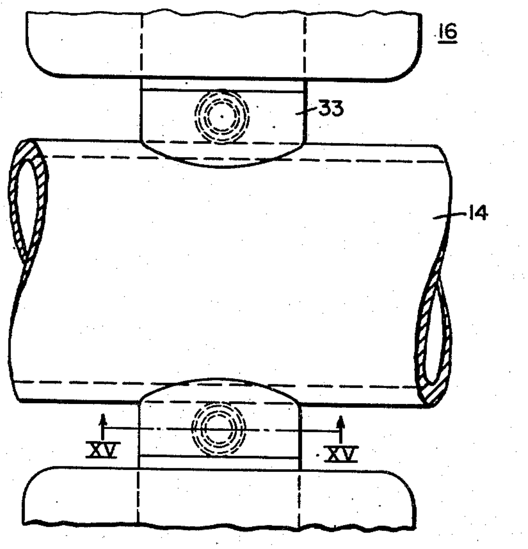
Figs. 13, 14 and 15 are enlarged views of the support for the sliding jaw of the switch.
Figure 14:
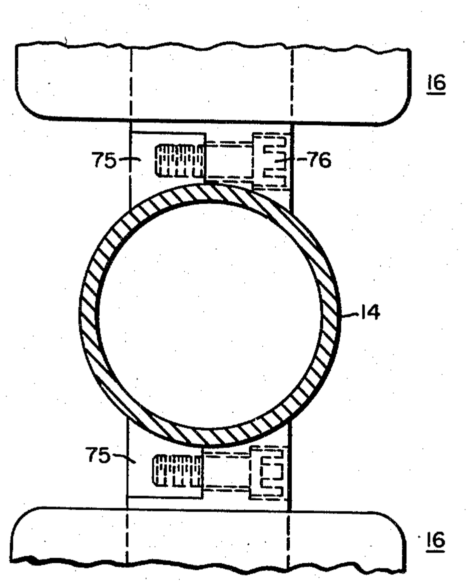
Figure 15:
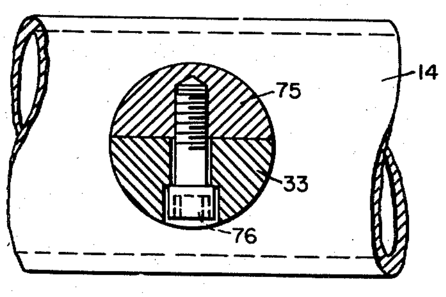

As shown in Figs. 13, 14 and 15, the inserts 33, which are utilized to support the portion of the conductor 14 into which the blade 15 telescopes during opening of the switch, are of a slightly different construction from the inserts 34. Each insert 33 has a removable wedge-like portion 75 which is retained in position by a screw 76 which extends through the fixed portion of the insert and is threaded into the removable portion 75. As shown, each insert 33 has a generally concave surface for engaging the conductor 14 when the removable portion 75 is in position.

With the insert 33 it is not necessary to move the conductor 14 longitudinally into position between oppositely disposed insulators. When the members 75 are removed, the conductor 14 may be moved transversely into position between the oppositely disposed insulators. The removable portions 75 are then installed and drawn against the conductor by means of the screws 76, thereby preventing transverse movement of the conductor 14. The inserts 33 may be utilized for supporting the conductor throughout the bus structure at any point where it is not necessary to prevent longitudinal movement of the conductor.

Figure 16:
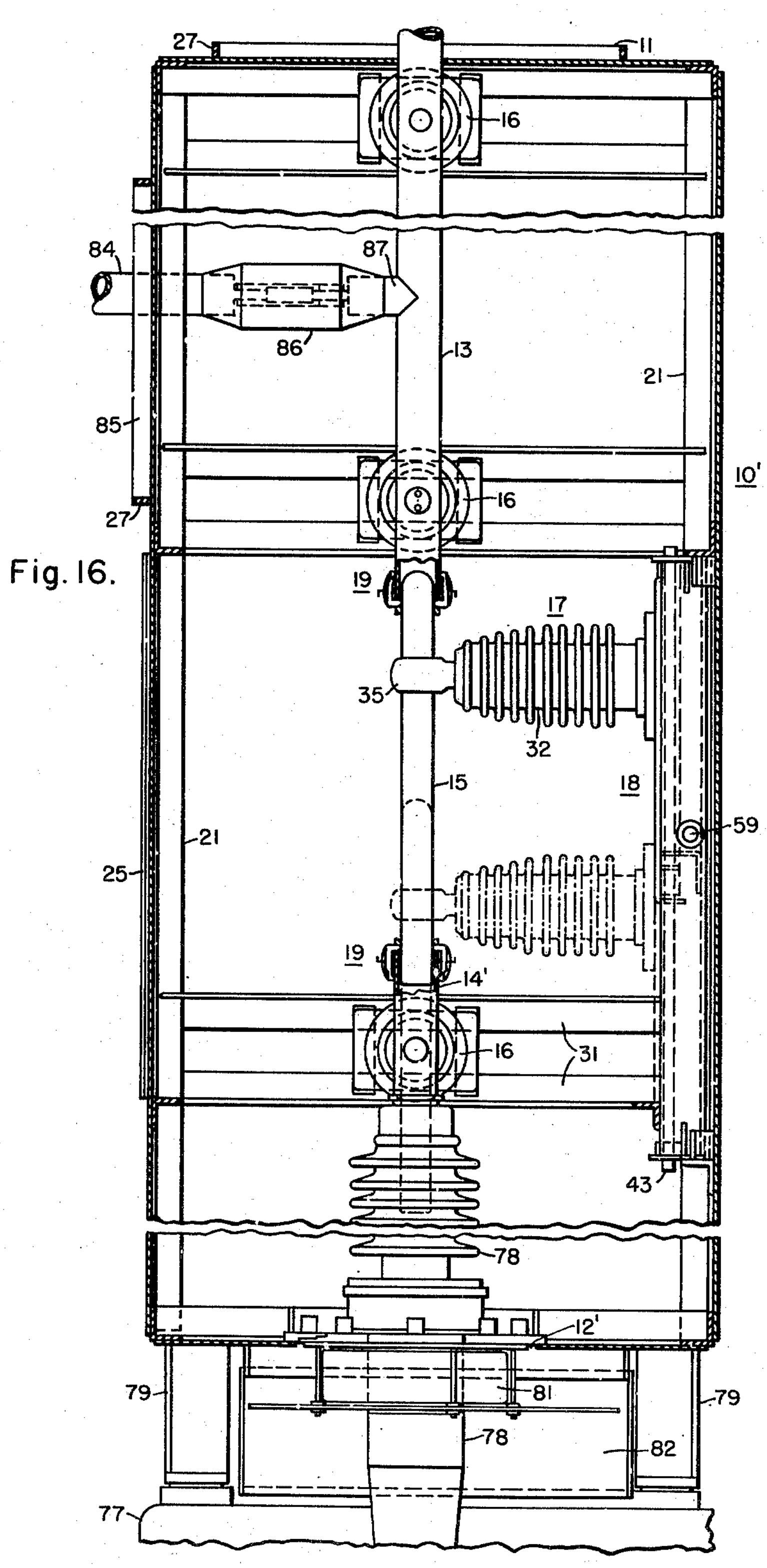
Fig. 16 is a view, partly in section and partly in elevation, of a modified switch structure.

The disconnecting switch structure shown in Fig. 16 is particularly suitable for utilization with an electrical apparatus unit, such as a circuit breaker 77, having a terminal 78 of the condenser bushing type. As shown, the disconnecting switch housing 10′ is mounted on top of the circuit breaker unit. The housing 10′ is supported by support members 79. A current transformer 81 may be mounted on the terminal 78 in a space 82 between the top of the breaker 77 and the bottom of the housing 10′.

The terminal bushing 78 extends through an opening 12′ in the lower end of the housing 10′ and is provided with a hollow cylindrical conductor 14′ which terminates inside the housing 10′ in axial alinement with the conductor 13. The disconnecting switch blade 15 connects the conductors 13 and 14′ when the switch is in the closed position. Contact members 19 are provided on the conductors 13 and 14′ for engaging the blade 15 as previously described.

The housing 10′ is similar in construction to the housing 10 previously described. The conductor 13 is supported by insulators 16 as hereinbefore described. Likewise, the conductor 14′ is supported by oppositely disposed insulators 16.

The blade member 15 is carried by the insulator 17 which is mounted on the carriage 18 and reciprocated in the manner previously described. It will be noted that the carriage 18 moves in a vertical plane in the present structure instead of a horizontal plane. Since the carriage is mounted on the guide rods 43 and 44, as previously described, it is suitable for operation in a vertical plane as well as in a horizontal plane. The blade 15 telescopes into the terminal bushing 78 as shown by the broken lines.

As previously explained, a cylindrical housing (not shown) may be attached to the flange 27 on the upper end of the housing 10′. Thus the conductor 13 may be connected to the bus conductor of an isolated phase bus structure. As shown, a branch or tap connection 84 may extend through an opening 85 in one side of the housing 10′. A flange 27 surrounds the opening 85 to permit a cylindrical housing to be attached to the housing 10′. A corona shield 86 may be provided around the joint between the conductor 84 and the tap connection 87 which is secured to the conductor 13.

As previously explained, the structure shown in Fig. 16 may be utilized with apparatus units having terminals of the condenser bushing type, thereby effecting a saving in the amount of space required for the disconnecting switch structure since the switch blade telescopes into the terminal bushing. As also previously explained, a plurality of switch units such as the one shown may be operated simultaneously by the same operating mechanism, thereby insuring proper operation of the switches required for a multi-phase system.

From the foregoing description it is apparent that we have provided a disconnecting switch suitable for utilization in a high voltage isolated phase bus structure. The switch is constructed to withstand the high impulse voltage tests required for certain high voltage power systems. Furthermore, the switch is constructed to require a minimum amount of space and at the same time maintain the clearance necessary for high voltage operation. The switch is so constructed that it may be mounted in either a vertical or a horizontal plane, the operating mechanism being such that it will operate satisfactorily in either a vertical or a horizontal plane.

Since numerous changes may be made in the above-described construction, and different embodiments of the invention may be made without departing from the spirit and scope thereof, it is intended that all matter contained in the foregoing description or shown in the accompanying drawings shall be interpreted as illustrative and not in a limiting sense.

We claim as our invention:

1. In a switchgear structure, in combination, a housing having openings at opposite ends thereof, a hollow cylindrical conductor extending through each opening and terminating inside the housing, the ends of said conductors in the housing being spaced axially, insulators mounted in the housing to support the conductors in axial alinement, a reciprocating switch member connecting the spaced ends of the conductors, said switch member telescoping into one of said conductors past the point of support of at least one of said insulators to open the switch, a reciprocating carriage for supporting the switch member, spaced guide rods in the housing for slidably supporting the carriage, and mechanical means for reciprocating the carriage on said guide rods.

2. In a disconnecting switch structure, in combination, a box-like housing having openings at opposite ends thereof, a hollow cylindrical conductor extending through each opening and terminating inside the housing, the ends of said conductors in the housing being spaced axially, oppositely disposed insulators in the housing for supporting the conductors in axial alinement, a reciprocating switch member connecting the spaced ends of the conductors, said switch member telescoping into one of said conductors between at least two of said oppositely disposed insulators to open the switch, a reciprocating carriage for supporting the switch member, guide means in the housing for slidably supporting the carriage, gear means for reciprocating the carriage, and a shaft for driving the gear means.

3. In a disconnecting switch structure, in combination, a box-like housing having openings at opposite ends thereof, a hollow cylindrical conductor extending through each opening and terminating inside the housing, the ends of said conductors in the housing being spaced axially, oppositely disposed insulators in the housing for supporting the conductors in axial alinement, a reciprocating switch member connecting the spaced ends of the conductors, said switch member telescoping into one of said conductors between at least two of said oppositely disposed insulators to open the switch, a reciprocating carriage for supporting the switch member, spaced guide rods in the housing for slidably supporting the carriage, rack and pinion means for reciprocating the carriage, and a shaft extending transversely of the housing for driving the pinion.

4. In a disconnecting switch structure, in combination, a box-like housing having circular openings at opposite ends thereof, a hollow cylindrical conductor extending through each opening and terminating inside the housing, the ends of said conductors in the housing being spaced axially, oppositely disposed insulators mounted inside the housing for supporting the conductors in axial alinement on the centerline through said openings, a reciprocating switch member connecting the spaced ends of the conductors, said switch member telescoping into one of said conductors between at least two of said oppositely disposed insulators to open the switch, a reciprocating carriage having an insulator mounted thereon for supporting the switch member, said insulator being at right angles to said oppositely disposed insulators, spaced guides in the housing for slidably supporting the carriage, gear means for reciprocating the carriage, and a shaft extending transversely of the housing for driving the gear means.

5. In a disconnecting switch structure, in combination, a box-like metal housing, hollow cylindrical conductors terminating inside the housing, the ends of said conductors in the housing being spaced axially, oppositely disposed insulators in the housing for supporting the conductors in axial alinement, a reciprocating switch member connecting the spaced ends of the conductors, said switch member telescoping into one of said conductors between at least two of said oppositely disposed insulators to open the switch, a reciprocating carriage for supporting the switch member, spaced guide rods in the housing for slidably supporting the carriage, gear means for reciprocating the carriage, a shaft for driving the gear means, and a plurality of spring-biased rigid contact fingers disposed around the periphery of each conductor to slidably engage the reciprocating switch member.

6. In a disconnecting switch structure, in combination, a box-like housing having openings at opposite ends thereof, a hollow cylindrical conductor extending through each opening and terminating inside the housing, the ends of said conductors in the housing being spaced axially, oppositely disposed insulators in the housing for supporting the conductors in axial alinement, a reciprocating switch member connecting the spaced ends of the conductors, said switch member telescoping into one of said conductors between at least two of said oppositely disposed insulators to open the switch, a reciprocating carriage for supporting the switch member, spaced guides in the housing for slidably supporting the carriage, gear means for reciprocating the carriage, a shaft for driving the gear means, and a plurality of spring-biased rigid contact fingers disposed around the periphery of each conductor to slidably engage the reciprocating switch member, each contact finger having one end engaging the outside of the conductor and the other end slidably engaging the switch member as it enters the conductor.

7. In a disconnecting switch structure, in combination, a box-like metal housing, hollow cylindrical conductors terminating inside the housing, the ends of said conductors in the housing being spaced axially, oppositely disposed insulators in the housing for supporting the conductors in axial alinement, a reciprocating switch member connecting the spaced ends of the conductors, said switch member telescoping into one of said conductors between at least two of said oppositely disposed insulators to open the switch, a reciprocating carriage for supporting the switch member, guide means in the housing for slidably supporting the carriage, gear means for reciprocating the carriage, a shaft for driving the gear means, and a plurality of spring-biased rigid contact fingers disposed around the periphery of each conductor to slidably engage the reciprocating switch member, each contact finger having one end engaging the outside of the conductor and the other end having an offset portion slidably engaging the switch member as it enters the conductor.

8. In a disconnecting switch structure, in combination, a box-like housing having openings at opposite ends thereof, a hollow cylindrical conductor extending through each opening and terminating inside the housing, the ends of said conductors in the housing being spaced axially, oppositely disposed insulators in the housing for supporting the conductors in axial alinement, a reciprocating switch member connecting the spaced ends of the conductors, said switch member telescoping into one of said conductors between at least two of said oppositely disposed insulators to open the switch, a reciprocating carriage for supporting the switch member, guide means in the housing for slidably supporting the carriage, gear means for reciprocating the carriage, a shaft for driving the gear means, and a plurality of spring-biased rigid contact fingers disposed around the periphery of each conductor to slidably engage the reciprocating switch member, each contact finger having one end engaging the outside of the conductor and the other end having an offset portion slidably engaging the switch member as it enters the conductor, and a ring disposed inside the conductor to engage said offset portions to retain the fingers on the conductor.

9. In a disconnecting switch structure, in combination, a box-like housing having openings at opposite ends thereof, a hollow cylindrical break jaw contact extending through the opening in one end of the housing, a hollow cylindrical sliding jaw contact extending through the opening in the other end of the housing, said contacts being spaced axially in the housing, insulators mounted in the housing to support said contacts in axial alinement, a cylindrical switch blade connecting said contacts, one end of said blade being disposed inside of the break jaw and the other end of the blade being disposed inside of the sliding jaw when the switch is closed, said blade telescoping into the sliding jaw past the point of support of at least one of said insulators to open the switch, a reciprocating carriage for supporting the switch blade, guide means mounted in the housing for supporting the carriage, and gear means for reciprocating the carriage on said guide rods.

10. In a disconnecting switch structure, in combination, a box-like housing having openings at opposite ends thereof, a hollow cylindrical break jaw contact extending through the opening in one end of the housing, a hollow cylindrical sliding jaw contact extending through the opening in the other end of the housing, said contacts being spaced axially in the housing, insulators mounted in the housing to support said contacts in axial alinement, a cylindrical switch blade connecting said contacts, one end of said blade being disposed inside of the break jaw and the other end of the blade being disposed inside of the sliding jaw when the switch is closed, said blade telescoping into the sliding jaw past the point of support of at least one of said insulators to open the switch, a reciprocating carriage for supporting the switch blade, guide means disposed in the housing parallel to said cylindrical contacts for supporting the carriage, a rack and pinion for reciprocating the carriage on said guide rods, and a shaft for driving said pinion.

11. In a disconnecting switch structure, in combination, a box-like housing, a hollow cylindrical break jaw contact disposed in the housing, a hollow cylindrical sliding jaw contact disposed in the housing, said contacts being spaced axially in the housing, insulators mounted in the housing to support said contacts in axial alinement, a cylindrical switch blade connecting said contacts, one end of said blade being disposed inside of the break jaw and the other end of the blade being disposed inside of the sliding jaw when the switch is closed, said blade telescoping into the sliding jaw past the point of support of at least one of said insulators to open the switch, a reciprocating carriage for supporting the switch blade, guides disposed in the housing parallel to said cylindrical contacts, bearing means slidably disposed on said rods for supporting said carriage, gear means for reciprocating the carriage, and a shaft for driving said gear means.

12. In a disconnecting switch structure, in combination, a box-like housing having openings at opposite ends thereof, a hollow cylindrical break jaw contact extending through the opening in one end of the housing, a hollow cylindrical sliding jaw contact extending through the opening in the other end of the housing, said contacts being spaced axially in the housing, insulators mounted in the housing to support said contacts in axial alinement, a cylindrical switch blade connecting said contacts, one end of said blade being disposed inside of the break jaw and the other end of the blade being disposed inside of the sliding jaw when the switch is closed, said blade telescoping into the sliding jaw past the point of support of at least one of said insulators to open the switch, a metal pan for supporting the switch blade, a pair of spaced guide rods mounted in the housing parallel to said cylindrical contacts, bearing blocks slidably disposed on said rods for supporting said pan, a rack and pinion for reciprocating the pan, and a shaft for driving said pinion.

13. In a switchgear structure, in combination, an elongated housing, an elongated round conductor disposed inside the housing longitudinally of the housing, separate oppositely disposed insulators rigidly mounted in the housing for supporting the conductors, a metal insert having one end secured in one end of each insulator, the exposed end of each insert having a generally concave surface for engaging the conductor, said exposed end having a detachable portion movable transversely of the conductor, and threaded means for retaining said detachable portion in position against the conductor.

14. In a switchgear structure, in combination, an elongated housing, an elongated round conductor disposed inside the housing longitudinally of the housing, separate oppositely disposed insulators rigidly mounted in the housing for supporting the conductor, a metal insert having one end secured in one end of each insulator, the exposed end of each insert having a generally concave surface for engaging the conductor, said exposed end having a wedge-like detachable portion movable transversely of the conductor for retaining the conductor in position, and threaded means for drawing the detachable portion against the conductor.

15. In a disconnecting switch structure, in combination, a housing, a cylindrical break jaw contact disposed in the housing, a cylindrical sliding jaw contact spaced axially from the break jaw contact, a cylindrical switch blade connecting said contacts, oppositely disposed insulators rigidly mounted in the housing to support said contacts in axial alinement, a metal insert having one end secured in one end of each insulator, the exposed end of each insert having a generally concave surface for engaging the contact, said exposed end having a groove therein extending longitudinally of the contact, a block disposed in said groove and attached to the contact. and threaded means for retaining the block in the groove to prevent longitudinal movement of the block and the contact.

16. In a disconnecting switch structure, in combination, a housing, a cylindrical break jaw contact disposed in the housing, a cylindrical sliding jaw contact spaced axially from the break jaw contact, a cylindrical switch blade connecting said contacts, separate oppositely disposed insulators mounted in the housing to support said contacts in fixed position in the housing and in axial alinement, a movable insulator for carrying the switch blade, a metal insert having one end secured in one end of said movable insulator, the other end of said insert having a generally cylindrical opening therein for receiving the switch blade, and threaded means extending through the opening and the switch blade into the insert for retaining the blade in the insert.

17. In a switchgear structure, in combination, a housing having openings at opposite ends thereof, a hollow cylindrical conductor extending through one of said openings and terminating inside the housing, an insulating terminal bushing extending through the other opening and having a hollow cylindrical conductor terminating inside the housing, the ends of said conductors in the housing being spaced axially, insulators mounted in the housing to support the first-named conductor in axial alinement with the terminal conductor, a reciprocating switch member connecting the spaced ends of the conductors, said switch member telescoping into the terminal conductor to open the switch, a reciprocating carriage for supporting the switch member, and mechanical means for reciprocating the carriage in the housing.

18. In a switchgear structure, in combination, a housing having openings at opposite ends thereof, a hollow cylindrical conductor extending through one of said openings and terminating inside the housing, an insulating terminal bushing extending through the other opening and having a hollow cylindrical conductor terminating inside the housing, the ends of said conductors in the housing being spaced axially, insulators mounted in the housing to support the first-named conductor in axial alinement with the terminal conductor, a reciprocating switch member connecting the spaced ends of the conductors, said switch member telescoping into the terminal conductor to open the switch, a reciprocating carriage for supporting the switch member, guide means in the housing for slidably supporting the carriage, and gear means for reciprocating the carriage.

19. In a switchgear structure, in combination, an electrical apparatus unit having an insulating terminal bushing thereon, a housing disposed above said unit and having openings at opposite ends thereof, said terminal having a hollow cylindrical conductor extending through one of said openings and terminating inside the housing, another hollow cylindrical conductor extending through the other opening and terminating inside the housing, the ends of said conductors in the housing being spaced axially, insulators mounted in the housing to support said other conductor in axial alinement with the terminal conductor, a reciprocating switch member connecting the spaced ends of the conductors, said switch member telescoping into the terminal conductor to open the switch, a reciprocating carriage for supporting the switch member, spaced guide rods in the housing for slidably supporting the carriage, and gear means for reciprocating the carriage vertically.

20. In a switchgear structure, in combination, an electrical apparatus unit having an insulating terminal bushing thereon, a housing disposed adjacent to said unit and having openings at opposite ends thereof, said terminal having a hollow cylindrical conductor extending through one of said openings and terminating inside the housing, another hollow cylindrical conductor extending through the other opening and terminating inside the housing, the ends of said conductors in the housing being spaced axially, insulators mounted in the housing to support said other conductor in axial alinement with the terminal conductor, a reciprocating switch member connecting the spaced ends of the conductors, said switch member telescoping into the terminal conductor to open the switch, a reciprocating carriage for supporting the switch member, spaced guide rods in the housing for slidably supporting the carriage, and gear means for recoprocating the carriage.

References Cited in the file of this patent

UNITED STATES PATENTS

| | | |
|---|---|---|
| 2,229,006 | Rudd | Jan. 14, 1944 |
| 2,376,818 | Rubel | May 22, 1945 |